United States Patent [19]

Stravrinidis

[11] Patent Number: 4,765,198

[45] Date of Patent: Aug. 23, 1988

[54] ENERGY STORAGE WHEEL

[75] Inventor: Constantine Stravrinidis, Oegstgeest, Netherlands

[73] Assignee: Agence Spatiale Europeenne, Paris, France

[21] Appl. No.: 82,994

[22] Filed: Aug. 7, 1987

Related U.S. Application Data

[63] Continuation of Ser. No. 804,539, Dec. 4, 1985, abandoned.

[30] Foreign Application Priority Data

Dec. 7, 1984 [FR] France .................................. 84 18725

[51] Int. Cl.⁴ .................. G05G 1/00; F16F 15/22; B65H 81/00
[52] U.S. Cl. .................. 74/572; 74/573 R; 156/161; 156/218
[58] Field of Search .................. 74/572, 573 R, 574, 74/573; 156/161–165, 218

[56] References Cited

U.S. PATENT DOCUMENTS

| | | | |
|---|---|---|---|
| 3,964,341 | 6/1976 | Rabenhorst | 74/573 R |
| 3,977,273 | 8/1976 | Ernst et al. | 74/572 |
| 4,176,563 | 12/1979 | Younger | 74/572 |
| 4,183,259 | 1/1980 | Giovachini et al. | 74/572 |
| 4,186,623 | 2/1980 | Friedericy et al. | 74/572 |
| 4,263,819 | 4/1981 | Poubeau | 74/573 R |
| 4,343,203 | 8/1982 | Jacobson et al. | 74/572 |
| 4,344,806 | 8/1982 | Kramer | 156/218 |
| 4,359,912 | 11/1982 | Small | 74/572 |
| 4,502,349 | 3/1985 | Abiven et al. | 74/572 |
| 4,695,340 | 9/1987 | Matuska et al. | 156/161 |
| 4,695,341 | 9/1987 | Matuska | 156/161 |

FOREIGN PATENT DOCUMENTS

| | | | |
|---|---|---|---|
| 2622295 | 12/1977 | Fed. Rep. of Germany | 74/572 |
| 2949125 | 6/1981 | Fed. Rep. of Germany | 74/572 |
| 3024636 | 1/1982 | Fed. Rep. of Germany | 74/572 |
| 2242607 | 3/1975 | France | 74/572 |
| 2232737 | 3/1976 | France | 74/572 |
| 55-30514 | 3/1980 | Japan | 74/572 |
| 57-6143 | 1/1982 | Japan | 74/572 |

OTHER PUBLICATIONS

Scientific American, vol. 229, No. 6, pp. 17–23 (Dec. 1973).
Flywheel Tech. Symposium, Oct. 1980 (D.O.E. Wash., D.C.) "Design and Fabrication".
Flywheel Tech Symposium, Oct. 1980 (D.O.E. Wash., D.C.) "Flywheel Energy Accumulators".
Patents Abstracts of Japan, vol. 6, No. 65 (M-124) [943], Apr. 24, 1982; & JP-A-57 6143 (Akebono Brake Kogyo K.K.).
Patents Abstracts of Japan, vol. 4, No. 64 (M-11) [546], May 14, 1980, p. 121M11; & JP-A-55 30 514 (Hitachi Kenki K.K.) 4.03.1980.

*Primary Examiner*—Gary L. Smith
*Assistant Examiner*—Vinh Luong
*Attorney, Agent, or Firm*—Oblon, Fisher, Spivak, McClelland & Maier

[57] ABSTRACT

An energy storage wheel containing a plurality of solid peripheral segments juxtaposed side by side in the direction of the circumference of the wheel and made from a material having a high density and a low thermal expansion coefficient, such as stainless steel or ceramics. The solid peripheral segments are secured one with respect to the next one and as a whole by using a first and a third continuous winding, respectively, which are connected to the hub of the wheel by a second winding. The windings are constructed of filaments of a material whose density is less than that of the material from which the wheel segments are made.

6 Claims, 2 Drawing Sheets

FIG. 1
PRIOR ART
FIG. 2
PRIOR ART
FIG. 3
PRIOR ART
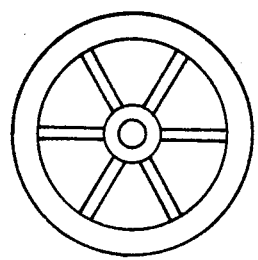
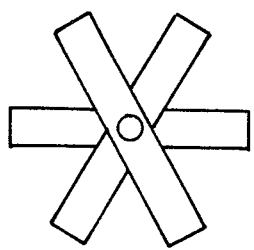
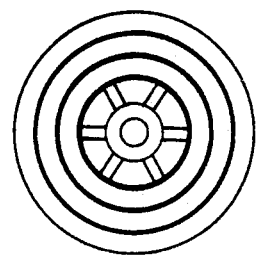
FIG. 4
PRIOR ART
FIG. 5
PRIOR ART
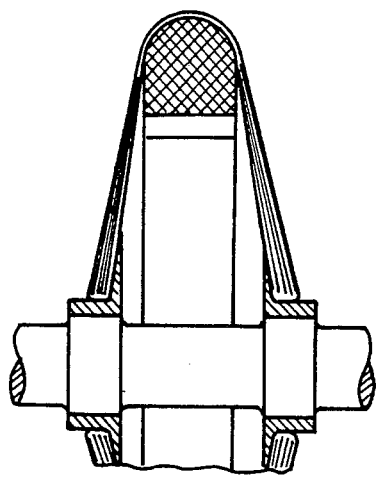
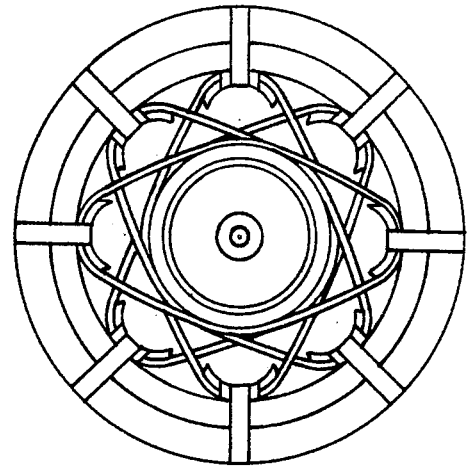

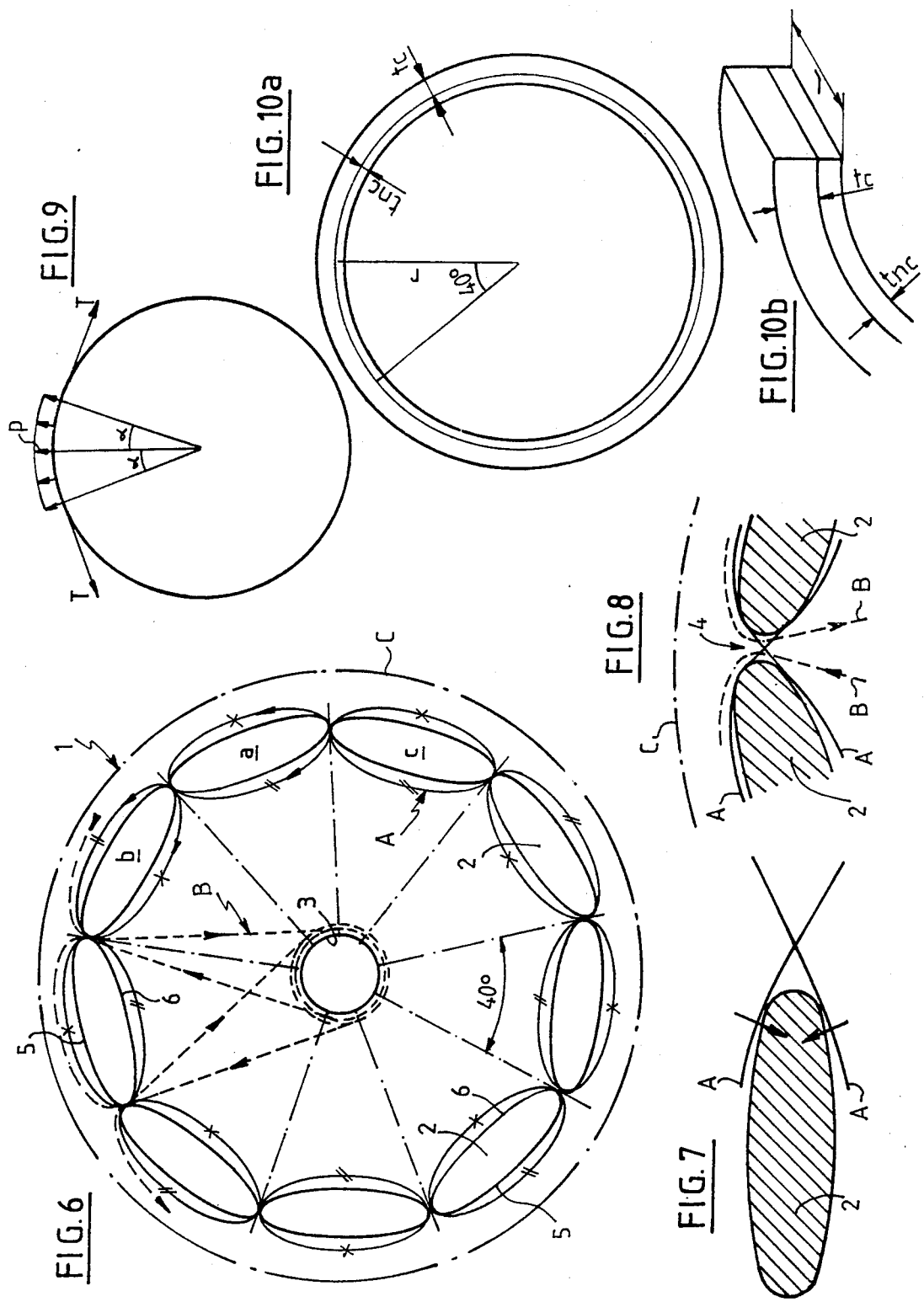

ENERGY STORAGE WHEEL

This application is a continuation of application Ser. No. 804,539, filed on Dec. 4, 1985, now abandoned.

BACKGROUND OF THE INVENTION

1. Field of the Invention

The present invention relates to an energy storage wheel, or inertia flywheel, of the hybrid type, namely comprising portions made more particularly from a composite material and portions made from a non composite material.

2. Description of the Prior Art

The completely metal conventional inertia flywheel, formed by a ring (or hoop or rim) connected to a hub by means of spokes, (cf. FIG. 1 accompanying the present description), is outside the field of the present invention because it has a geometry which is not adapted to the use of composite fiber materials, composite material flywheels being made from circumferentially wound fibers impregnated with epoxy resin based materials.

The replacement of metal flywheels by those which use composite materials has brought the following advantages:

the possibility of storing a larger amount of energy per unit of mass of the flywheel, because of the higher resistance to tensile forces of the fibers, and an improvement in the bursting behavior when the value which the tensile strength has at the bursting point of the fibers is accidentally exceeded ; in fact, if the fibers are acted on by forces beyond their bursting strength, instead of being reduced to large fragments, as in case of metal, they are reduced to small fragments , and eventually into powder, which is particularly important in the case of space application.

Composite material flywheels of the prior art include an original rimless construction in the form of a star, (cf. SCIENTIFIC AMERICAN vol. 229, No. 6, December 1973, pages 17 to 23 as well as FIG. 2 accompanying the present description), which comprises solely a plurality of spokes, each spoke being made from a composite material having the direction of the fibers parallel to the length of each spoke, so that the centrifugal forces induce only lengthwise radial stresses in the fibers, which are thus optimally stressed.

Although this solution avoids the problem of delamination, namely the transverse displacement of the fibers due to the forces acting perpendicularly to the longitudinal direction of the fibers and to the shear forces between fibers, it has the following disadvantages :

the volume containing useful material is relatively small because the spokes occupy only a fraction of the volume swept out by their free ends, so that for storing a given amount of energy the useful volume must be increased, which also increases the cost and limits the field of application the spokes are unevenly stressed lengthwise, the portions highly stressed being those which are the closest to the hub, in which high moments are generated when the flywheel is spun up, which prevents making the best use of the performance of said fibers, need to fix spokes to the hub by piercing the midpoints of these spokes creates serious problems because the cross section is reduced precisely where the stresses are highest.

Another known design (cf. again the above mentioned document SCIENTIFIC AMERICAN as well as FIG. 3 accompanying the present description) is a flywheel comprising a plurality of concentric rings made from a composite material and separated from each other by a clearance.

The concentric rings have a density which increases towards the center so as to improve the stress distribution, and each separation clearance is filled with elastomeric bonded bands allowing relative expansion of the different rings.

However, this second solution requires the use of filaments of thick fibers, which presents difficulties in terms of processes for manufacturing such fibers, particularly during the curing process. Furthermore, the structure is likely to induce delamination effects in the body of the rings.

More recent composite flywheel designs are aimed at optimizing the stresses induced by centrifugal forces in all the fibers . The geometrical configuration of such flywheels is such that most of the fibers are stressed radially up to a very high level, so as to make optimal use of these high mechanical strength materials under the best conditions, i.e. such that the stresses induced by the centrifugal forcesare directed along the length of the fibers .

A composite material flywheel satisfying this requirement comprises (cf. FLYWHEEL TECHNOLOGY SYMPOSIUM, October 1980, pages 4 to 12 as well as FIG. 4 accompanying the present description), an external ring which is composed of layers of carbon fibers embedded in an epoxy resin matrix and wound along the circumference of the ring, and an internal ring composed of windings of very high mechanical strength steel fibers which are also embedded in an epoxy resin matrix: the two rings are joined together by means of an appropriate bonding agent.

This double ring is connected to the hub by means of a carbon fiber/epoxy resin web which envelops the external ring and which plays the role of connecting "spokes".

Another flywheel corresponding to the above criterion also comprises (cf. again FLYWHEEL TECHNOLOGY SYMPOSIUM, October 1980, pages 168 to 173 as well as FIG. 5 accompanying the present description) a double ring composed of "Kevlar" fibers in its outer portion where the tangential speed is the highest, and "S" glass fibers, of higher density, in the inner portion.

This double ring is connected to the hub of the flywheel by means of a plurality of loops which are disposed between the internal part of the double ring and the hub and which play the role of connecting "spokes" in which the profile of their free portion is that of a polar catenary.

Such loops are made from a composite material having low density and also a low modulus of elasticity whose value is such that the tensile stress in the loops remains less than that in the ring.

In the last two designs which have been described, the differences in density and modulus of elasticity of the materials used for constructing said internal and external rings are such that, under the effect of the centrifugal force, the internal ring would expand more than the external ring if their expansion was able to take place freely, so that, because of the mutual contact existing between these rings, the external ring compresses the internal ring limiting the forces which are induced therein . This same criterion is applied to the second of these last two designs for constructing the hub which comprises an internal aluminum portion reinforced by an overwrap made from a composite "Kevlar"/epoxy resin material.

Now, in each of these last two designs, the "spokes" support a considerable portion of the load produced by the (double) ring when the flywheel is operating, so that the maximum value of the energy which can be stored is limited by the design of said "spokes".

Furthermore, the stability of the flywheels varies during acceleration and slowing down, which is a disadvantage more particularly in space applications.

The aim of the present invention is therefore to provide an inertia flywheel (or an energy storage wheel) which satisfies practical requirements more than previously known flywheels, in particular in that:

the maximum energy which may be stored per unit of mass of the flywheel of the invention, i.e. the specific energy of the flywheel, is substantially independent of the design of the "spoke" of the wheel, i.e. that it is not limited by the intrinsic resistance of the material from which these "spokes" are made, the problem of delamination is substantially reduced and, in any case, the effects due to a possible delamination are eliminated, and a larger amount of energy may be stored in a wheel of given diameter.

SUMMARY OF THE INVENTION

The present invention provides an energy storage wheel comprising a plurality of solid peripheral segments juxtaposed side by side in the direction of the circumference of the wheel and made from a material having a high density and a low thermal expansion coefficient, in particular a metal and preferably stainless steel, or from ceramic or other, which segments are joined one with respect to the next one and as a whole by means of a first and third continuous winding, respectively, and are connected to the hub of the wheel by a second winding, said windings consisting of filaments of an appropriate material whose density is less than that of the material from which the wheel segments are made.

In a preferred embodiment of the energy storage wheel of the invention, said first winding joining together the different segments one with respect to the next is a continuous winding whose filament is applied, for each turn effected in the direction of the circumference, alternately over the whole of the profile of the external face of a segment and over the whole of the profile of the internal face of the contiguous segment which follows it in the winding direction, the first segment being joined to the second at the beginning of the second turn, whereas the last segment is joined to the first at the end of the second turn.

In another preferred embodiment of the energy storage wheel of the invention, said second winding is a continuous winding whose filament is applied to the external face solely of said juxtaposed segments and which is also applied tangentially to the hub of the wheel by passing from one segment to the next.

of the invention, said third winding is continuous winding whose filament is disposed on the eternal face of said juxtaposed segments, while extending from one end to the other of the circumference of the wheel, after having applied said first and second windings.

In a preferred embodiment of the energy storage wheel of the invention, each segment has a section whose profile is convex.

In an advantageous arrangement of this embodiment, each segment is cylindrical with an oval section.

In an advantageous feature of this arrangement, each segment is disposed with a small axis of the oval section directed radially.

In another preferred embodiment of the energy storage wheel of the invention, the juxtaposed segments are uneven in number and are preferably equal to nine.

In a preferred embodiment of the energy storage wheel of the invention, the filaments forming the different windings are made from composite materials, more especially from carbon fibers whose thickness is of the order of a millimeter.

In an advantageous variant of this embodiment, the filaments forming the different windings are made from a non composite material, more particularly from stainless steel or similar.

Besides the preceding arrangements, the invention comprises other arrangements which will be clear from the following description.

BRIEF DESCRIPTION OF THE DRAWINGS

The invention will be better understood from the complement of description which follows with reference to the accompanying drawings in which:

FIGS. 1 to 5 show five flywheel configurations proposed in the prior art,

FIG. 6 illustrates schematically the flywheel of the present invention,

FIGS. 7 and 8 show details relating to FIG. 6, and

FIGS. 9, 10a and 10b refer to the study of feasibility which accompanies the description of the flywheel of the invention.

It should however be understood that these drawings and the corresponding descriptive parts are given solely by way of illustration of the subject of the invention and are in no way a limitation thereof.

DESCRIPTION OF THE PREFERRED EMBODIMENTS

The flywheels proposed in the prior art—which are illustrated in FIGS. 1 to 5 and which have been described above. FIG. 1 refers to a conventional flywheel made from a non composite material, whereas FIGS. 2 to 5 refer to flywheels made from composite materials. In particular, FIG. 2 relates to the "rimless" flywheel and FIG. 3 the "concentric ring" flywheel, whereas FIGS. 4 and 5 refer to different recent flywheel constructions corresponding to the criterion for stressing most of the fibers in longitudinal direction. All aim at obtaining a stress/density ratio which is the highest possible, because the specific energy, namely the energy which can be theoretically stored per unit mass of a given flywheel, is proportional to this ratio. The tendency is to aim at attaining the theoretical value of 400 Wh/kg for this specific energy.

However, in practice flywheels are constructed for which the specific energy is normally situated around 60 Wh/kg, and a maximum of 120 Wh/kg has been reported. The design criterion of a flywheel on the basis of the principle attempting to attain said specific energy maximum has thus become doubtful because, as the above data shows, the composite materials are not used to their performance limits.

The flywheel, or energy storage wheel, of the invention is illustrated in Figgre 6.

The wheel comprises a plurality of solid peripheral segments 2 juxtaposed side by side in the circumferential direction of the wheel and made from a material having a high density and low thermal expansion coefficient. Non-limitative examples of materials usable within the scope of the invention are stainless steel, "Invar", a nickel-iron alloy whose expansion coefficient is negligible, or ceramics.

Segments 2 are joined together in the following way:

by means of a first continuous winding A which secures one segment 2 to the next, by means of a second continuous winding B which connects the segments 2 to the hub 3 of the wheel, and by means of a third continuous winding C which secures the segments 2 together as a whole.

These three windings A, B and C are wound from filaments which are preferably made from a composite material and whose density is less than that of the segments 2.

The introduction of elements (segments 2) having a density greater than that of the material from which the connecting windings A, B and C are made into the design of an energy storage wheel corresponds to a design criterion which consists in increasing the mass of a flywheel and so in reducing its specific energy, which manifestly contrasts with the design criterion of the prior art flywheels.

However, although it is true that the maximum value of the specific energy which can be stored decreases with respect to the case where the peripheral ring 1 of the flywheel is made entirely from composite material windings, it should be recognized that the use of non composite materials cooperating with composite materials for constructing the peripheral ring 1 allows a structure to be obtained to which in practice a high specific energy corresponds which easily exceeds the maximum value of 120 Wh/kg related to the prior art and corresponding to the use of composite materials only, as the feasibility study, which is developed below will show.

The reason for this a priori unforeseeable result resides in the fact that the filaments of the windings, particularly of the third winding C, are stressed to the maximum of their performance under the action of the uniform radial centrifugal load exerted by segments 2 which act as a radial load distributing means.

To this end, it is advantageous for the radial thickness of the windings, more especially winding C, to be relatively small; this condition is another essential difference with respect to the prior art designs and results in eliminating the effects of a possible delamination.

In the preferred embodiment illustrated in FIG. 6, the preferred number of segments 2 is equal to 9 and, therefore, an angle of 40° corresponds to each segment.

It is advantageous for each segment 2 to have in cross section a convex profile and preferably a cylindrical profile with oval cross section with a small axis of this oval section directed radially. This arrangement allows the different filaments to be wound while maintaining these latter constantly tensioned and any peripheral (or tangential) slipping to be eliminated when the flywheel is set in rotation (cf. FIG. 7).

The maximum radial thickness of each segment 2 is a few millimeters.

Furthermore, winding A, which has a continuous filament (particularly a carbon fiber based one) whose thickness is of the order of a millimeter is applied, for each turn effected in the direction of the circumference, alternately over the whole of the profile of the external face 5 of the segment and over the whole of the profile of the internal face 6 of the adjacent segment which follows it in the winding direction (cf. FIGS. 6 and 8).

It can be seen that the first segment 2, represented for example by segment a, is only secured to the second segment, denoted by b, at the beginning of the second turn, and that the third segment, denoted by c, is only secured to the first segment a at the end of the second turn, so that complete securing together of the segments with respect to each other is obtained by making two complete turns of the filament of winding A in the way indicated above (in FIG. 6, a cross and two parallel lines designate the first and second turns, respectively).

After winding A, winding B is made, having also a continuous filament. Winding B is applied only to the external face 5 of said juxtaposed elements 2 and also tangentially to the hub 3 of the wheel, while passing from one segment to the next (cf. again FIGS. 6 and 8).

The tangential arrangement of winding B about the hub eliminates the compression stresses in its filaments.

Winding B is intended to connect, in the manner of the spokes of a bicycle, the peripheral ring 1 to the hub 3 of the wheel—without, however, being stressed by the load produced by this ring.

This condition is very important because the maximum specific energy which may be attained is not limited by the intrinsic resistance of the "spokes" B of the wheel of the invention contrary to what happens in the prior art designs, in particular those shown in FIGS. 4 and 5.

This result is obtained:

by using for winding B a filament having a modulus of elasticity lower than that of the filament of winding C, and by using a reduced number of turns, namely by effecting a smaller number of turns about the circumference of the wheel.

Winding B improves the strength of winding A, by interaction with this latter at the level of the crossing points 4 (cf. FIG. 8).

Winding C is a continuous filament which is disposed on the external face 5 of the juxtaposed segments 2 while running several times from one end to the other over the circumference of the wheel, and this after having laid windings A and B.

The radial thickness of winding C although greater than that of windings A and B, remains however relatively small so as to uniformly load its filaments and so as to eliminate—as has already been mentioned—the effects of a possible delamination.

This winding C is intended to reinforce the wheel with respect to expansion thereof, as well as to support substantially the whole of the load since most of the stress due to the centrifugal forces appear in this winding. Therefore, it is advantageous to use fibers having a very high modulus of elasticity/tensile strength ratio. Winding C continues to play its role as support for the load even in the case where windings A and C have the same modulus, for winding C is shorter than winding A due to the winding methods used.

However, it is advantageous for the modulus of elasticity of winding C to be greater than that of winding B, so as to avoid radial stresses at the level of the peripheral ring 1.

Having seen the important effects of the choice of a small number of windings, together with a low modulus so that winding B may play essentially the role of means connecting the peripheral ring 1 to the hub 3 of the wheel without having to support any appreciable load, it should be stated that, once the number of windings is fixed for the radial thickness of winding C, the number of windings for windings A and B depends on the structural constraints, for example on the need not to induce in these windings an excessively high radial stress and balanced radial and tangential stresses.

The hybrid design of the flywheel of the present invention has, as a not insignificant advantage, a substantial reduction in the dimensions of the flywheels constructed in accordance with the foregoing arrangements with respect to the prior art flywheels. To give an idea of this reduction in size, it is sufficient to state by way of non limitative example that a flywheel of a diameter equal to 50 cm may be replaced by a flywheel whose diameter is only 20 cm, while being capable of storing the same amount of energy, which means that with the same diameter a greater amount of energy may be stored.

It should be emphasized that the embodiment shown in FIG. 6, and described above, in no way limits the scope of the invention, in that particular materials may be used different from those mentioned by way of example, not only for the solid peripheral segments of the energy storage wheel, but also for the windings, which could be made also from filaments of a non-composite material similar to the segments, although this does not offer a great advantage in practice.

In addition, although it is preferred to use an uneven number of segments, this condition is not limitative either.

It should also be mentioned that preferably the ratio between the density of the peripheral segments of the energy storage wheel of the invention and the density of the windings A, B and C is between 8 and 12.

FEASIBILITY STUDY

This study is based on the following assumptions:
when the flywheel is rotated at the nominal angular speed $\omega$, the centrifugal force appears as a uniform radial pressure p,
this radial load is supported essentially by the external portion of the windings, namely by the composite material portion of the wheel which envelops the non composite material segments, since the stresses which appear in the "spokes" of the wheel are much smaller than those appearing in the external composite material portions.

Now, said radial load induces in a given element of the external resistant portion of the wheel, made from a composite material, a stress T which is directed tangentially and which, for obvious reasons of symmetry, has the same intensity on each side of said element.

For the dynamic balance of this element (cf. FIG. 9), the following relationship must be satisfied:

$$2T \sin \alpha = p \cdot 2\alpha r \cdot L$$

where L is the axial width of the energy storage wheel.

For a small $\alpha$, it may be assumed that $\sin \alpha \cong \alpha$, which means that:

$$2T \cdot \alpha \cong p \cdot 2\alpha r \cdot L$$

and so that:

$$T \cong p \cdot r \cdot L$$

Now, the radial pressure p corresponds to the centrifugal force $$f = \Delta m \cdot \omega^2 r = p \cdot \Delta S = p \cdot 2\alpha r \cdot L,$$

where $\Delta S$ is the surface of the element, whereas:

$$\Delta m = \Delta m_c + \Delta m_{nc},$$

namely that $\Delta m$ is the sum of the mass $\Delta m_c$ of the composite material element and of the mass $\Delta m_{nc}$ of the non composite material portion formed by the segments of the wheel, of densities $\rho_c$ and $\rho_{nc}$, respectively. So:

$$\Delta m_c = \rho_c \cdot \Delta S \cdot t_c$$

$$\Delta m_{nc} = \rho_{nc} \cdot \Delta S \cdot t_{nc},$$

$t_c$ and $t_{nc}$ being the thicknesses of the composite and non composite material portions, respectively (cf. also FIGS. 10a and 10b).

This means that:

$$f = (\rho_c \cdot \Delta S \cdot t_c + \rho_{nc} \cdot \Delta S \cdot t_{nc}) \cdot \omega^2 r$$

namely that:

$$\frac{f}{\Delta S} = \frac{f}{2\alpha r L} = p = (\rho_c \cdot t_c + \rho_{nc} \cdot t_{nc}) \cdot \omega^2 r = p_c + p_{nc},$$

$p_c$ and $p_{nc}$ representing, in equivalent pressure, the centrifugal forces corresponding respectively to the composite and non composite material peripheral portions of the energy storage wheel, namely:

$$p_c = \rho_c \cdot t_c \cdot \omega^2 r$$

$$p_{nc} = \rho_{nc} \cdot t_{nc} \cdot \omega^2 r$$

The stress $\sigma'_c$ induced per unit of cross section of the composite material portion is given by:

$$\sigma'_c = \frac{T}{t_c \cdot L}$$

which, per unity of axial width of the wheel is equal to $(T/t_c)$, namely:

$$\sigma_c = \frac{T}{t_c} = \frac{p \cdot r}{t_c} = \frac{(p_c + p_{nc}) \cdot r}{t_c}.$$

Assuming now that the different magnitudes given above have, for example, the following values:

$$-\omega = 30000 \text{ rpm} = \frac{30000 \cdot 2\pi}{60} = 1000 \ \pi \text{rad/s}$$

$$-r = 25 \text{ cm} = 25 \cdot 10^{-2} \text{ m}$$

(we assume, for the sake of simplicity, that the radius r is the same for all the portions, composite and non composite, of the peripheral ring), L = 6cm = $6 \cdot 10^{-2}$ m
$P_c = 1.5 \times 10^3$ kg/m³
$P_{nc} = 8 \cdot 10^3$ kg/m³
$t_{nc} = 1$ cm = $10^{-2}$ m, it is interesting to calculate the value of the said stress $\sigma_c$ for different values of the thickness $t_c$ of the composite material resistant portion, more particularly:

for $t_c = 1$ cm $= 10^{-2}$ m=, we have $$\sigma_c = \frac{\rho_c \cdot t_c \cdot \omega^2 \cdot r + \rho_{nc} \cdot t_{nc} \cdot \omega^2 \cdot r}{t_c} \cdot r =$$

$$\frac{1.5 \times 10^3 \times 10^{-2} \cdot (1000\pi)^2 \cdot 25 \times 10^{-2} +}{10^{-2}} \cdot 25 \cdot 10^{-2} =$$

$$\left(\frac{3}{8} \cdot \pi^2 \cdot 10^7 + 2 \cdot \pi^2 \cdot 10^7\right) \cdot 25 =$$

$$\frac{19}{8} \cdot \pi^2 \cdot 10^7 \cdot 25 \simeq 5.86 \cdot 10^9 \text{ N/m}^2$$

for $t_c = 2$ cm $= 2 \cdot 10^{-2}$ m, we have:

$$\sigma_c = \left(\frac{6}{8} \cdot \pi^2 \cdot 10^7 + 2 \cdot \pi^2 \cdot 10^7\right) \cdot \frac{25}{2} =$$

$$\frac{22}{8} \cdot \pi^2 \cdot 10^7 \cdot \frac{25}{2} \simeq 3.39 \cdot 10^9 \text{ n/m}^2$$

whereas for $t_c = 3$ cm $= 3 \cdot 10^{-2}$ m, we have:

$$\sigma_c = \left(\frac{9}{8} \cdot \pi^2 \cdot 10^7 + 2 \cdot \pi^2 \cdot 10^7\right) \cdot \frac{25}{3} =$$

$$\frac{25}{8} \cdot \pi^2 \cdot 10^7 \cdot \frac{25}{3} \simeq 2.57 \cdot 10^9 \text{ N/m}^2$$

It goes without saying that $\sigma_c$ can be reduced subsequently (and so the radial expression, see the following) by increasing the value of $t_c$, for example to 4 cm $= 4 \cdot 10^{-2}$ m. However, it is considered that the last value of $\sigma_c = 2.57 \times 10^9 \text{N/m}^2$ ensures a sufficient margin of safety with respect to composite materials, more especially carbon fiber based materials, whose stress limit $\sigma_{c,max} = 4 \cdot 10^9 \text{N/m}^2$ (in this case $\sigma_c \simeq 64.25\%$ of $\sigma_{c,max}$).

Hereunder, the (radial) centrifugal force $R_{cr}$ acting on the peripheral composite material portion of the wheel will be compared with the radial force $R_{cs}$ which acts on the "spokes" of this wheel. The calculation of $R_{cr}$ and $R_{cs}$ being referred to the unit of axial width L of the energy storage wheel of the invention.

The calculation of $R_{cr}$ is immediate, considering that said radial pressure $p = p_c + p_{nc}$ acts on the surface $2\pi r \cdot L$, namely $2\pi r$ if we again refer to the unit of axial width L. So (for $t_c = 3 \cdot 10^{-2}$ m):

$$R_{cr} = 2\pi r \cdot p =$$

$$2\pi \cdot 25 \times 10^{-2} \cdot \frac{25}{8} \cdot \pi^2 \cdot 10^7 \text{ N/m} \simeq 48.4 \times 10^7 \text{ N/m}.$$

The calculation of $R_{cs}$ is given hereafter.

Young's modulus $E_{cr}$ of the peripheral portion of the wheel, made from carbon fibers, is given by:

$$E_{cr} = \frac{1}{\Delta l} \cdot \sigma_c = 3 \cdot 10^{11} \text{ N/m}^2$$

where l is the length of the peripheral portion, namely $l = 2\pi r$, whereas $\Delta l$ is the variation of the length due to the expansion of the fibers under the action of the centrifugal force.

So we can write that (with the data given above):

$$\Delta l = \frac{1}{E_{cr}} \cdot \sigma_c = \frac{2\pi r \cdot \sigma_c}{E_{cr}} =$$

$$\frac{2\pi \cdot 25 \cdot 10^{-2} \cdot 2.57 \cdot 10^9}{3 \cdot 10^{11}} m \simeq 1.34 \cdot 10^{-2} m.$$

If we show with $\Delta r$ the variation of the radius r of the wheel following the expansion, we may also write for $\Delta l$ as follows:

$$\Delta l = 2\pi \cdot (r + \Delta r) - 2\pi r = 1.34 \cdot 10^{-2} \text{ m},$$

which allows $\Delta r$ to be recalculated, which is:

$$\Delta r \simeq \frac{1.34 \cdot 10^{-2}}{2\pi} m$$

and so the ratio $(r/\Delta r)$ (or $(\Delta r/r)$), which is related to Young's modulus $E_{cs}$ of the "spokes" of the wheel (with 9 peripheral segments, we have 9 of these "spokes"). It is assumed that $E_{cs} = 1.5 \times 10^{11} \text{N/m}^2$.

On the foregoing basis, we may therefor write:

$$E_{cs} = \frac{r}{\Delta r} \cdot \sigma_s,$$

from which:

$$\sigma_s = E_{cs} \cdot \frac{\Delta r}{r} =$$

$$1.5 \times 10^{11} \cdot \frac{1.34 \times 10^{-2}}{2\pi \cdot 25 \cdot 10^{-2}} \text{ N/m}^2 = \frac{4}{\pi} \cdot 10^9 \text{ N/m}^2.$$

If $t_s$ is the thickness of the "spokes" of the energy storage wheel, $t_s \cdot L$ is the resistant section of each "spoke", so $9 \cdot t_s \cdot L$ is the resistant section of the whole of the "spokes" of the wheel, so that, still referring to the unit of axial width L, the radial force $R_{cs}$ which acts on the 9 "spokes" is given, assuming that $t_s = 1$ mm $= 10^{-3}$ m, by:

$$R_{cs} = 9 \cdot \sigma_s \cdot t_s = 9 \cdot \frac{4}{\pi} \cdot 10^9 \cdot 10^{-3} \simeq 1.15 \times 10^7 \text{N/m}.$$

Since:

$$\frac{R_{cr}}{R_{cs}} = 42,$$

so that $R_{cr} \gg R_{cs}$, we deduce—as had been anticipated—that the "spokes" of the wheel of the invention do not appreciably contribute to the radial rigidity.

It should be noted that the relative variation of the radius r of the wheel does not raise particular problems since it is very small. In fact, with the above given data, we have:

$$\frac{\Delta r}{r} = \frac{1.34 \times 10^{-2}}{2\pi \cdot 25 \cdot 10^{-2}} \cong 0.85 \cdot 10^{-2}.$$

It is easy to check that, in the case where $E_{cr}=2\cdot10^{11}N/m^2$, $R_{cs}=1.74\times10^7N/m$ and that, therefore, also in this case, the "spokes" of the energy storage wheel of the invention do not limit the performances of the composite material peripheral resistant portion of the wheel.

In the following, the kinetic energy ⊔ stored, at the angular speed $\omega=30,000$ rpm is calculated in a wheel whose width $L=6$ cm$=6\cdot10^{-2}$ m, as well as the maximum kinetic energy ⊔$_{max}$ corresponding to the maximum angular speed $\omega_{max}$.

We may write that:

$$\sqcup = \tfrac{1}{2}mv^2 = \tfrac{1}{2}m\omega^2 r^2,$$

where the mass m is obtained by adding to the contributions per unit of axial width L, $\Delta m_c$ and $\Delta m_{nc}$, calculated for $\alpha=\pi$ (which have been given above and which are due to the composite and non composite material peripheral portions of the wheel), the contribution (also referred to the unit of width) due to the 9 "spokes" of this wheel, namely the quantity:

$$\Delta m_s = 2\alpha r \cdot \rho_c \cdot 2\pi r \cdot 9 \cdot t_s.$$

For $\alpha=\pi$, we have per unit of axial width L:

$$\frac{m}{L} = (\Delta m_c)_{\alpha=\pi} + (\Delta m_{nc})_{\alpha=\pi} + (\Delta m_s)_{\alpha=\pi} =$$

$$2\pi r \cdot (\rho_c \cdot t_c + \rho_{nc} \cdot t_{nc} + \rho_c \cdot t_s) = 2\pi r \cdot$$

$$(3 \cdot 10^{-2} \cdot 1.5 \times 10^3 + 10^{-2} \cdot 8 \cdot 10^3 + 0.9 \times 10^{-2} \cdot 1.5 \times 10^3) =$$

$$2\pi r \cdot (3.9 \times 1.5 \times 10 + 80) =$$

$$2\pi \cdot 25 \cdot 10^{-2} \cdot 138.5 = 217.5 \text{ kg/m},$$

so, for $L=6$ cm$=6\cdot10^{-2}$ m, we obtain:

$$m = 217.5 \cdot 6 \cdot 10^{-2} \text{ kg} \cong 13 \text{ kg}.$$

It follows that:

$$\sqcup = \frac{1}{2} m\omega^2 r^2 = \frac{1}{2} \cdot 13 \cdot (1000\pi)^2 \, 25^2 \cdot 10^{-4} \, Ws =$$

$$\frac{1}{2} \cdot 13 \cdot \frac{1000^2 \cdot \pi^2 \cdot 25^2 \cdot 10^{-4}}{60 \cdot 60} \text{ Wh} =$$

$$\frac{1}{2} \cdot 13 \cdot \frac{25 \cdot 25}{6.6} \cdot \pi^2 \text{ Wh} \cong$$

$$\frac{1}{2} \cdot 13 \cdot 171 \text{ Wh} \cong 1 \cdot 1 \text{ kWh}.$$

In so far as the calculation of ⊔$_{max}$ is concerned, it is sufficient to assume that $\sigma_c=\sigma_{cmax}=4\cdot10^9 N/m^2$ in the relationship $$\sigma_c = \frac{T}{t_c},$$

namely, still referring to the unit of axial width L of the wheel, we assume that:

$$T_{max} = p_{max} \cdot r = \sigma_{c,max} \cdot t_c.$$

so we can write that:

$$(\rho_{nc} \cdot t_{nc} + \rho_c \cdot t_c) \cdot \omega^2_{max} \cdot r^2 = 4 \cdot 10^9 \cdot t_c,$$

which allows $\omega^2_{max}$ to be calculated:

$$\omega^2_{max} = \frac{4 \cdot 10^9 \cdot t_c}{(\rho_{nc} \cdot t_{nc} + \rho_c \cdot t_c) \cdot r^2} =$$

$$\frac{4 \cdot 10^9 \cdot t_c}{(8 \cdot 10^3 \cdot 10^{-2} + 1.5 \times 10^3 \cdot 3 \times 10^{-2}) \cdot 25^2 \cdot 10^{-4}} =$$

$$\frac{12}{12.5 \times 25^2} \cdot 10^6 = 15.36 \cdot 10^6 \text{ rad}^2/s^2,$$

which gives:

$$\omega_{max} = 37425 \text{ rad/s}$$

and $$\sqcup_{max} = \frac{1}{2} \cdot \frac{13 \cdot 15.36 \cdot 10^6 \cdot 25^2 \cdot 10^{-4}}{60 \cdot 60} \text{ Wh} =$$

$$\frac{1}{2} \cdot 13 \cdot \frac{25 \cdot 25}{6.6} \cdot 15.36 \text{ Wh} \cong \frac{1}{2} \cdot 13 \cdot 266 \text{ Wh}) \cong$$

$$1.7 \text{ kWh},$$

which allows the energy stored per unit of mass of the wheel of the invention to be readily calculated on the basis of the data given above by way of non-limitative example, namely the maximum specific energy $u_{s,max}$ corresponding to the limit stress $\sigma_{c,max}=4\cdot10^9 N/m^2$:

$$u_{s,max} = \frac{\sqcup_{max}}{m} \cong 133 \text{ Wh/kg}$$

which value is higher than the maximum theoretical value of 120 Wh/kg which was mentioned in the prior art.

Assuming that the composite material portion of the peripheral ring of the wheel of the invention is acted on by forces to 64.25% of its maximum tensile strength $\sigma_{c,max}$, namely that the value $\sigma_c=2.57\cdot10^9 N/m^2$ is not exceeded, we finally obtain in the example to which reference was made, a specific energy $u_s$ which is given by:

$$u_s = 64.25\% \cdot u_{s,max} \cong 86 \text{ Wh/kg},$$

which value is also greater than the value of 60 Wh/kg, which was obtained in the prior art, still with flywheels made completely from composite materials.

As is clear from the foregoing, the invention is in no way limited to those of its embodiments and modes of application which have just been described more explicitly. It embraces, on the contrary, all variants thereof which may occur to a technician skilled in the matter, without departing from the scope or spirit of the present invention.

What is claimed is:

1. An energy storage wheel comprising:
   (a) a hub;
   (b) a plurality of massive peripherally juxtaposed segments made from a material having a high density and a low thermal expansion coefficient, said segments having a radially external convex surface and a radially internal convex surface;
   (c) a first winding (A) securing each segment with respect to the segment which is juxtaposed to it on each peripheral side thereof, said first winding (A) consisting of at least one turn of a continuous filament, the filament of said at least one turn being disposed alternately on the radially external convex surface of one segment and on the radially internal convex surface of the segment which is juxtaposed to it on each peripheral side thereof;
   (d) a plurality of spokes, each one of said plurality of spokes comprises at least one turn of a second winding (B) made from a continuous filament, the filament of said at least one turn passing radially outwardly of said radially external convex surface of each one of said segments and being wound around said hub; and
   (e) a third winding (C) disposed radially outwardly of said first winding (A), said third winding (C) consisting of at least one turn of a continuous filament, the filament of said at least one turn passing outwardly of said radialy external convex surfaces of said segments, thus securing said segments together as a whole.

2. The energy storage wheel as claimed in claim 1 wherein the ratio between the density of said segments and the density of said first (A), second (B), and third (C) windings is greater than 1.

3. The energy storage wheel as claimed in claim 2 wherein said ratio is in the range of 8 to 12.

4. The energy storage wheel as claimed in claim 1 wherein the ratio between the density of said segments and the density of said first (A), second (B), and third (C) windings is equal to 1.

5. The energy storage wheel as claimed in claim 1, wherein said third winding (C) has a modulus of elasticity greater than the modulus of elasticity of said first winding (A).

6. The energy storage wheel as claimed in claim 1 wherein said second winding (B) has a modulus of elasticity less than the modulus of elasticity of said third winding (C).

* * * * *